United States Patent [19]

Champion

[11] Patent Number: 4,533,140
[45] Date of Patent: Aug. 6, 1985

[54] ANIMAL DETERRENT DEVICE FOR JOGGERS

[76] Inventor: Preston L. Champion, 101 Independence Dr., Greenville, S.C. 29615

[21] Appl. No.: 481,337

[22] Filed: Apr. 1, 1983

[51] Int. Cl.³ .............................................. A63B 59/00
[52] U.S. Cl. .................................... 273/84 R; 231/2 R
[58] Field of Search ......... 343/901; 273/84 R, 84 ES; 272/75; 33/137 R; 231/3; 116/328, 327, DIG. 6; 135/75; 84/477 B

[56] References Cited

U.S. PATENT DOCUMENTS

| | | | |
|---|---|---|---|
| 815,458 | 3/1906 | Morriss | 231/2 |
| 1,003,626 | 9/1911 | Malcolm | 33/137 R |
| 2,329,329 | 9/1943 | Brach et al. | 250/33 |
| 2,735,932 | 2/1956 | Textrom et al. | 343/901 X |
| 2,880,265 | 3/1959 | Race | 174/152 |
| 2,946,842 | 7/1960 | Chadowski | 174/153 |
| 3,125,287 | 3/1964 | Roehm | 231/2 |
| 3,554,546 | 1/1971 | Braunhut | 273/84 |
| 3,762,704 | 10/1973 | Gingras | 272/75 |
| 4,037,839 | 7/1977 | Nelson | 273/84 |
| 4,135,719 | 1/1979 | Braunhut | 273/84 |

OTHER PUBLICATIONS

Illustrated Catalogue of Musical Instruments, 1898, John C. Haynes and Co., Boston, Mass.

Primary Examiner—George J. Marlo
Attorney, Agent, or Firm—Bailey & Hardaway

[57] ABSTRACT

An animal deterrent device consists essentially of a palm-sized handle of six to eight inches in length for hand gripping and defining a housing within the central portion thereof to house a plurality of generally rigid tubular sections telescoping one within the other within the housing and being adhered thereto by a fusible adhesive adhering an outer sleeve of the telescoping sections. A pocket clip is attached to the handle and the plurality of sections when fully protracted extending to a length of about three feet with the overall apparatus weighing less than six ounces. The apparatus may additionally have a loop attached for hand transporting of the apparatus. The apparatus is utilized by a jogger upon an attacking animal by extending the telescoping sections to form a rigid whip-like structure so as to engage the attacking animal with the extended telescoping sections.

5 Claims, 6 Drawing Figures

WT. < 6oz.

~3 ft.

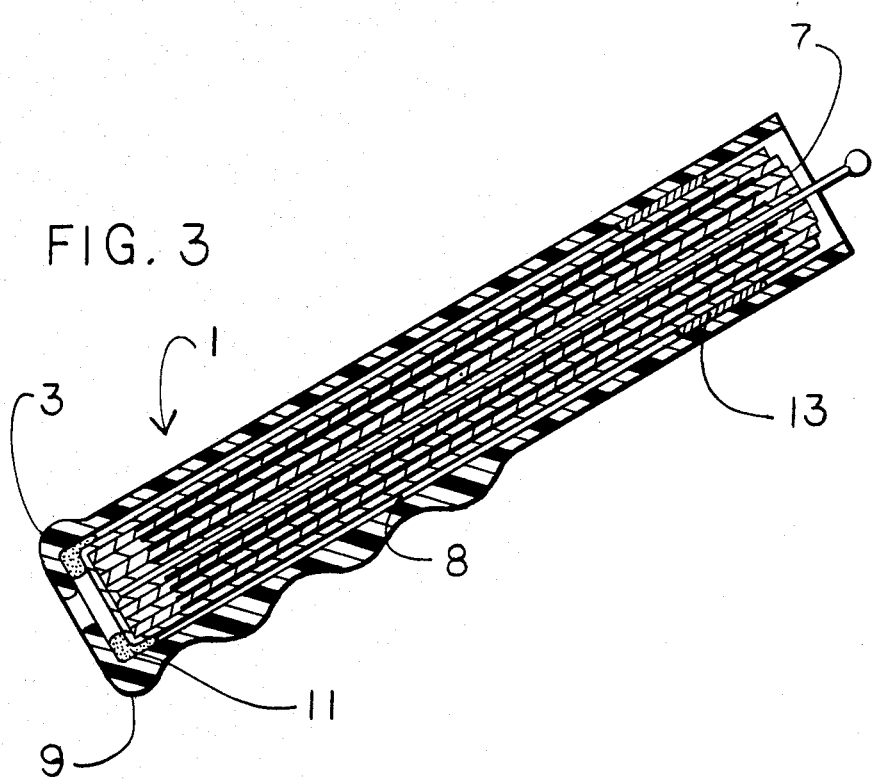
FIG. 3
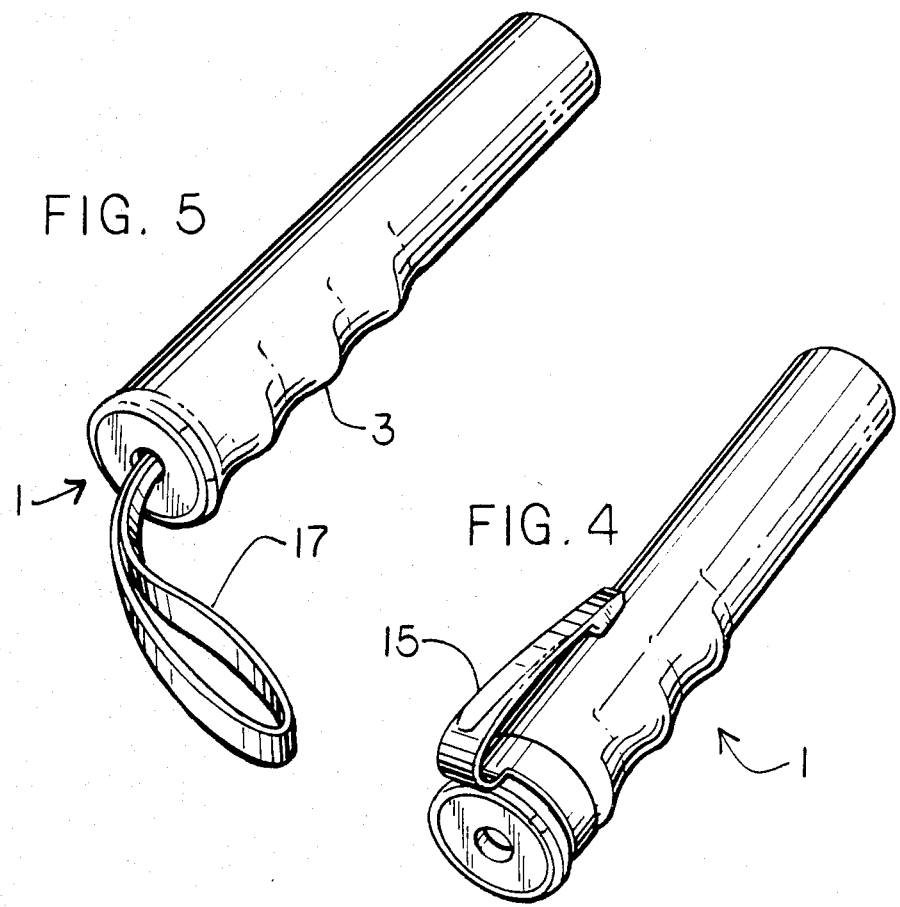
FIG. 5
FIG. 4

ANIMAL DETERRENT DEVICE FOR JOGGERS

BACKGROUND OF THE INVENTION

This invention relates generally to the art of animal deterrent devices, and more particularly to such a device for use by joggers.

The enhanced awareness of the need for increased physical activity by members of American society has brought about an avid group of individuals generally referred to as joggers. Joggers, for the most part, attempt to jog or run approximately one to five miles at a time, and attempt to do this several times a week. Most joggers utilize the public streets and sidewalks for this endeavor, and prefer residential areas due to the decreased automobile and truck traffic in these areas.

A real and imminent danger for joggers in residential neighborhoods is the overly protective nature of canine pets in such areas. The majority of such pets pose no real danger, but, none the less, strike fear into the hearts of many joggers to the extent that they, in some events, give up jogging altogether. This fear is brought about to a large extent because joggers have no real means of defending themselves against canine attack.

Joggers, in an attempt to overcome this lack of defense, have carried sticks, and even axe handles, on their person as they jog. These devices are unwieldly and cumbersome, and in some events these devices are actually dangerous due to the possibility of stumbling over such devices, or even striking one's self upon the legs. Additionally, after some period of time these devices become heavy and a burden to the jogger.

Other attempts to provide a means of defense against canine attack have comprised the use of aerosol repellents. While such repellents overcome many of the difficulties associated with the use of bulky sticks and handles, the user is, to a large extent, at the mercy of the winds. If a jogger attempts to utilize such aerosol repellents through a cross-wind, the likely outcome is insufficient contact. Such efforts serve only to further annoy and aggravate, and encouraging further confrontation by the canine.

Various prior art devices have been devised for use primarily by individuals against human aggressors. Such devices normally comprise short whips comprised of telescoping spring material. An example of such is described in the following U.S. Patents: U.S. Pat. Nos. 3,554,546 to Braunhut; 4,135,719 Braunhut; and 4,037,839 to Nelson. Morris, in U.S. Pat. No. 815,458, describes a combination walking cane and whip. Roehm discloses an animal deterrent device in U.S. Pat. No. 3,125,287 which may also be utilized as a ballgame apparatus.

While such devices have existed within the prior art, no device has been adequately developed to the point where it is useable by a jogger against canine attack.

SUMMARY OF THE INVENTION

It is thus an object of this invention to provide an apparatus for joggers to utilize against canine attack.

It is a further object of this invention to provide such an apparatus which is light and easily manageable during the jogging process.

It is a still further object of this invention to provide such an apparatus which may be carried in the palm of the hand.

It is still a further and more particular object of this invention to provide such an apparatus which is extendable to a length sufficient to enable the user thereof to fend off attacks from the ground.

These, as well as other objects, are accomplished in accordance with this invention by an animal deterrent device having a palm-sized handle which defines a cavity to act as a housing with a plurality of generally rigid sections telescoping one within the other, and substantially located totally within the housing when in the retracted position, but capable of extending to a length of about three feet.

BRIEF DESCRIPTION OF THE DRAWINGS

FIG. 3 of the drawings is a section view along the lines 3—3 of FIG. 1.

FIG. 4 of the drawings is a perspective view of yet another embodiment in accordance with this invention.

FIG. 5 of the drawings is a perspective view of a still further embodiment in accordance with this invention.

DETAILED DESCRIPTION

In accordance with this invention it has been found that a palm-sized handle housing a plurality of generally rigid telescoping sections which is extendable to a length of approximately three feet provides a convenient and unobtrusive means of defense for joggers. Various other advantages will become apparent from a reading of the following description with reference to the various figures of drawings.

Figure 1:
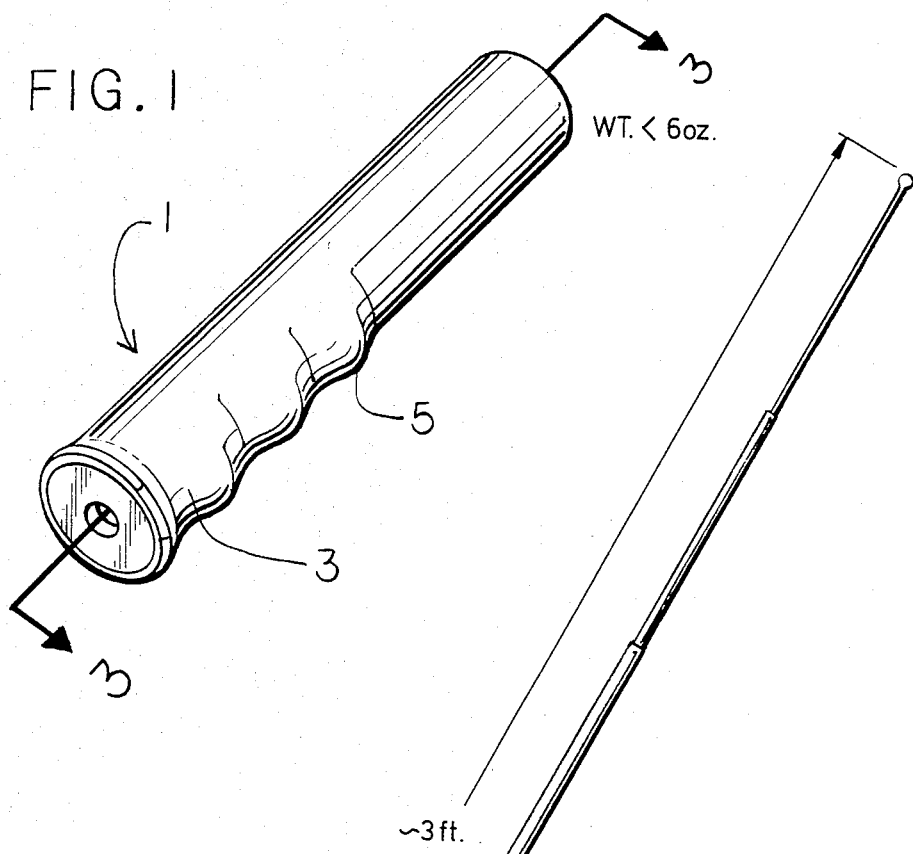
FIG. 1 is a perspective view of an animal deterrent apparatus in accordance with this invention in the fully retracted state.

FIG. 1 of the drawings illustrates the animal deterrent device 1 in accordance with this invention. FIG. 1 illustrates a handle 3 which is generally palm sized and is generally the type of handle utilized as a grip on a bicycle. In this regard, finger grips are shown at 5 in FIG. 1 as a preferred feature. FIG. 1 illustrates the device in its unactuated or retracted state for carrying.

Figure 2:
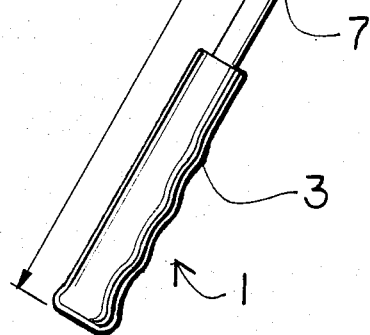
FIG. 2 of the drawings is a perspective view of the animal deterrent device in accordance with this invention in the fully extended state.
Figure 6:

FIG. 2 of the drawings illustrates the apparatus 1 in its activated state with a plurality of telescoped sections 7 fully extended into its activated state. The plurality of sections 7 extend to a length of approximately three feet to enable the user to fully fend off canine attacks from the ground.

The plurality of sections 7 are generally of the type utilized in an automobile radio antennae. Such devices are generally described in U.S. Pat. Nos. 2,329,329, 2,343,944, 2,880,265 and 2,946,842, the disclosures of which are hereby incorporated by reference. The plurality of sections are generally formed of steel or an aluminum alloy. In any event, the device is constructed to weigh approximately six (6) ounces or less so as to be no burden upon the jogger while carrying.

FIG. 3 of the drawings is a cross-section view along the line 3—3 of FIG. 1. This view illustrates the housing 8 defined by the handle 3 and, also, illustrates the attachment of the plurality of sections 7 to the handle 3. It is understood that any suitable mens of attachment may be utilized, but as illustrated in FIG. 3. The first of the generally rigid sections 7 is attached at end 9 for placement into the housing 8 defined by handle 3. The first of the sections 7 is preferably adhered to the generally plastic handle by a fusible material such as a hot-melt adhesive 11. Also illustrated within FIG. 3 is a sleeve 13 to stabilize the generally rigid sections 7 within handle 3.

The apparatus 1 in accordance with this invention may be simply carried in the hand of a jogger at very little effort and with no loss of mobility to any of the limbs. While there is no loss to the jogger due to the carrying of the apparatus in accordance with this invention, the mere presence of that apparatus instills within the jogger confidence that a canine attack may be successfully warded off. This confidence relieves feelings of apprehension which has heretofore been a deterrent to venturing out into unknown territories or, in some instances, to jog at all. When utilized in this mode the finger grips 5 provide for a natural grip for the hand of the jogger.

FIG. 4 of the drawings illustrates the apparatus 1 in accordance with this invention having thereon a clip 15 to enable the jogger to clip the apparatus either to a pocket or to some other garment such as a waist band.

FIG. 5 of the drawings illustrates yet another embodiment of the apparatus 1 in accordance with this invention. In this embodiment a strap 17 is attached to one end of the handle 3 so that the apparatus 1 may be carried about the neck or about the shoulders.

In any of the above described embodiments the apparatus 1 of this invention is carried in a retracted state. Upon the presence or attack of a canine, the user has merely to extend the plurality of generally rigid sections to the fully extended state. The mere visual appreciation of the presence of the apparatus of this invention will likely ward off canine attack. In the event, however, of actual attack, the jogger is in a position to soundly thrash the attacking canine to the extent that further attack would be discouraged.

While the apparatus of this invention is designed primarily for use in warding off canine attack, it is readily apparent that in the event of actual physical attack by another human being, that the apparatus of this invention would also find some utility in discouraging attacks upon the person.

It is thus seen that this invention provides a unique and novel apparatus for use by joggers in warding off canine attack. It is further seen that the apparatus in accordance with this invention provides a light and manageable means for instilling in joggers confidence that canine attack may be successfully prevented. As many variations will be apparent to those of skill in the art from a reading of the above description, such variations are within the spirit and scope of the invention as defined by the following appended claims.

What is claimed is:

1. An animal deterrent apparatus, consisting essentially of:
    a palm-sized handle of six to eight inches in length adapted for hand gripping, said handle defining a cavity therein to act as a housing;
    a plurality of generally rigid, tubular sections telescoping one within the other and substantially totally located within said housing when retracted thereinto and approximately consuming the volume of said housing; and
    a pocket clip attached to said handle;
    said plurality of sections when fully protracted extending to a length of substantially three feet and said apparatus weighing less than six ounces.

2. The apparatus according to claim 1 wherein said handle is contoured to contain finger grips to facilitate the hand carrying thereof.

3. The apparatus according to claim 1 wherein the outermost of said plurality of generally rigid sections is attached to said handle by a fusible material surrounding said outermost of said plurality of generally rigid sections for adherance to said handle.

4. The apparatus according to claim 3 further including a sleeve about the outermost of said generally rigid sections to stabilize said plurality of sections within said housing.

5. A process for deterring an attacking animal utilizing the apparatus according to claim 1 comprising the steps of:
    extending said plurality of sections to their fully extended length; and
    moving the handle thereof so as to engage the attacking animal with the fully extended sections.

* * * * *